March 31, 1959     C. N. SMITH     2,879,706
FLOOR FURNACE GRILL INSULATOR
Filed May 10, 1955
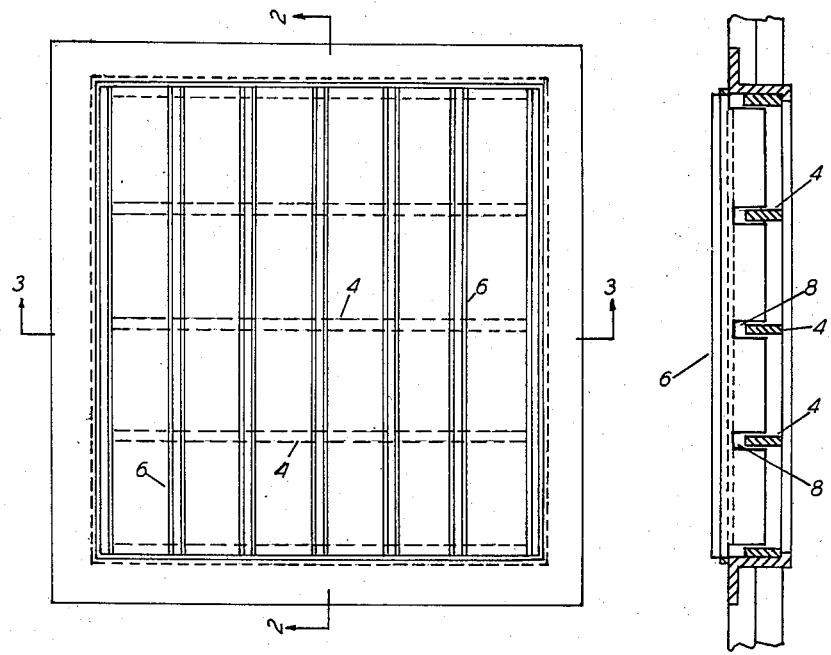
Fig. 1     Fig. 2
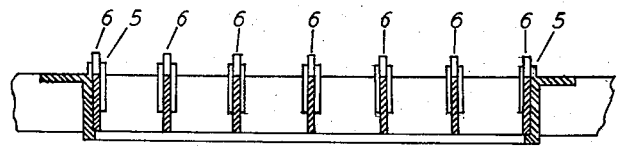
Fig. 3
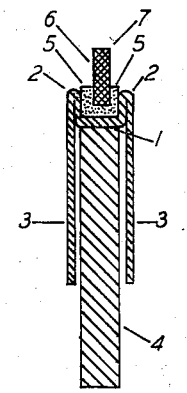
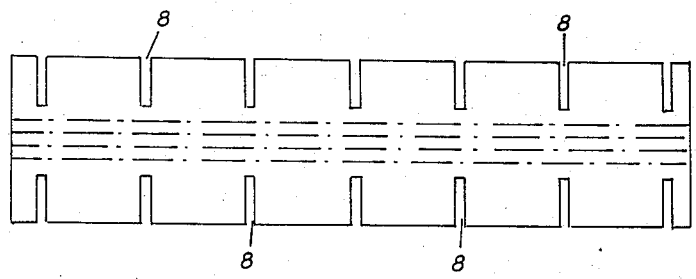
Fig. 4
Fig. 5
INVENTOR.
Charles N. Smith
BY Chas. Denegre
Attorney.

2,879,706
Patented Mar. 31, 1959

2,879,706

FLOOR FURNACE GRILL INSULATOR

Charles N. Smith, Fairfield, Ala.

Application May 10, 1955, Serial No. 507,446

1 Claim. (Cl. 98—101)

This invention relates to a floor furnace grill insulator. It has for its main objects to provide such an insulator that will be highly satisfactory for the purpose intended, simple in structure, comparatively cheap to manufacture, easy to install for use, and very durable.

The grill structure of a floor furnace becomes very hot when in use, often resulting in small children having their hands and legs severely burned by coming into contact with the top edges of the grill bars. Also the edges of the grill bars become very slippery often causing falling of persons walking upon them. The present invention will eliminate these objectional features of a floor furnace.

Other objects and advantages will appear from the drawings and specification.

By referring generally to the drawings, a part of this application, it will be observed that Fig. 1 is a plan view of the grill of a floor furnace; Fig. 2 is a sectional view on line 2—2 of Fig. 1; Fig. 3 is a sectional view on line 3—3 of Fig. 1; Fig. 4 is a detail sectional view enlarged showing the support on a grill bar with an insulating strip held in its upper groove; and Fig. 5 is a plan view of a support before it is bent to its finished shape for use.

Similar reference numerals refer to similar parts throughout the several views.

Referring to the drawings in detail it will be seen that the invention comprises a support that is made of thin flat metal formed with a groove 1 with the metal bent over at 2 and extending downward at 3 from the groove. The support fits tightly over the grill bar 4 for its full length. The insulation is composed of a strip 5 of adhesive treated thin material such as asbestos board and formed groove shape with a strip of canvas 6 folded and inserted tightly in the groove of the adhesive treated material and in the metal groove with the canvas extending slightly above the top edges of the metal groove. Some of the top strands are removed from the canvas to thus provide a soft fuzzy edge 7 to prevent contact with the top edge of the grill bar and avoid being burned, and also prevent easy slipping on the bar.

Each grill bar is equipped with one of the assembled insulators. Where there are cross bars slots 8 are made in the flanges 3 of the support to fit over the cross bars.

From the foregoing it will appear that any size of floor furnace may be equipped with an assembled insulator mounted on each of its bars. The assembled insulator may be made of any material suitable for the purpose, but I prefer to use thin metal for the support, heat treated material for inserting in the groove of the support, and canvas in two or more layers attached in the heat treated material before inserting in the support groove, with a plurality of strands removed from the outer edge of the canvas to thus provide a soft fuzzy surface over each grill bar. Also the parts of the assembled insulator may be made in different sizes and capacities, depending on how and where to be used.

While I have shown and described the preferred embodiment of my invention, I do not wish to limit same to the exact and precise details of structure, but reserve the right to make all modifications and changes so long as they remain within the scope of the invention and the following claim.

Having described my invention I claim:

A floor furnace grill bar insulator comprising, a support, said support being a strip of thin metal having a central shallow groove formed along in its entire length the portions of the metal on each side of the groove bent downward so as to form another and inverted groove of a size of fit upon the top edge of a grill bar; insulation, said insulation consisting of a heavy canvas strip formed as a groove along its entire length, a strip of adhesive treated asbestos board, said strip of asbestos board being inserted in the canvac groove with the canvas and asbestos thus formed inserted tightly in the upper shallow groove in the metal strip, with the edges of the canvas extending above the upper edges of the metal groove, said canvas edges having a plurality of strands of material removed to thus provide a soft fuzzy surface above the asbestos; said downwardly extending side portions having a plurality of slots formed in their lower edges adapted for fitting over transverse bars of a furnace grill.

References Cited in the file of this patent

UNITED STATES PATENTS

| | | |
|---|---|---|
| 2,066,910 | Canales | Jan. 5, 1937 |
| 2,587,633 | Levin | Mar. 4, 1952 |
| 2,611,937 | Kendrick | Sept. 30, 1952 |
| 2,625,875 | Tatum | Jan. 20, 1953 |
| 2,665,458 | Wilcox | Jan. 12, 1954 |

FOREIGN PATENTS

| | | |
|---|---|---|
| 821,238 | France | Aug. 17, 1937 |